United States Patent
Hancock et al.

(10) Patent No.: US 12,344,261 B2
(45) Date of Patent: Jul. 1, 2025

(54) CONTROLLING AN ELECTRIC MACHINE TO SUPPORT DIAGNOSTIC TESTING

(71) Applicant: JAGUAR LAND ROVER LIMITED, Coventry (GB)

(72) Inventors: Matthew Hancock, Rugby (GB); Marco D'Amato, Leamington Spa (GB); Ryan McIntyre, Thrussington (GB); Samuel Rios, Coventry (GB); Matthew Sullivan, Hinckley (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 239 days.

(21) Appl. No.: 17/920,755

(22) PCT Filed: Apr. 21, 2021

(86) PCT No.: PCT/EP2021/060436
§ 371 (c)(1),
(2) Date: Oct. 21, 2022

(87) PCT Pub. No.: WO2021/214171
PCT Pub. Date: Oct. 28, 2021

(65) Prior Publication Data
US 2023/0166746 A1    Jun. 1, 2023

(30) Foreign Application Priority Data
Apr. 21, 2020 (GB) ..................... 2005813

(51) Int. Cl.
*B60W 50/02* (2012.01)
*B60W 10/06* (2006.01)
(Continued)

(52) U.S. Cl.
CPC ........ *B60W 50/0205* (2013.01); *B60W 10/06* (2013.01); *B60W 10/08* (2013.01);
(Continued)

(58) Field of Classification Search
CPC .. B60W 50/0205; B60W 10/06; B60W 10/08; B60W 20/15; B60W 30/182;
(Continued)

(56) References Cited

U.S. PATENT DOCUMENTS

2008/0249695 A1 * 10/2008 Matthews ............. B60W 10/06
701/101
2009/0118080 A1    5/2009 Heap et al.
(Continued)

FOREIGN PATENT DOCUMENTS

JP    H10110636 A    4/1998
JP    2009046076 A *    3/2009
(Continued)

OTHER PUBLICATIONS

Machine translation of JP2009046076A downloaded from IP.com Jul. 31, 2024 (Year: 2024).*
(Continued)

*Primary Examiner* — Michael V Kerrigan
*Assistant Examiner* — Tanya C Sienko
(74) *Attorney, Agent, or Firm* — TROUTMAN PEPPER LOCKE LLP; Dustin B. Weeks; Carter B. Hale

(57) ABSTRACT

Aspects of the present invention relate to a method (400) and to a control system (208) for controlling at least one electric machine (212, 216) of a vehicle (10) to support diagnostic testing of a vehicle system (30) comprising an internal combustion engine (202), wherein the method (400) comprises: controlling a torque output (420) of the at least one electric machine (212,216) to allow a vehicle drive torque demand (410) to be met while the internal combustion engine (202) is operated within at least one torque threshold (432) for the diagnostic testing or operated at a torque setpoint (438) for the diagnostic testing.

14 Claims, 6 Drawing Sheets

(51) Int. Cl.
  *B60W 10/08* (2006.01)
  *B60W 20/15* (2016.01)
  *B60W 30/182* (2020.01)
  *B60W 50/035* (2012.01)

(52) U.S. Cl.
  CPC .......... *B60W 20/15* (2016.01); *B60W 30/182* (2013.01); *B60W 50/035* (2013.01); *B60W 2710/0666* (2013.01); *B60W 2710/083* (2013.01)

(58) Field of Classification Search
  CPC ....... B60W 50/035; B60W 2710/0666; B60W 2710/083
  See application file for complete search history.

(56) References Cited

U.S. PATENT DOCUMENTS

| | | | |
|---|---|---|---|
| 2009/0145673 A1 | 6/2009 | Soliman et al. | |
| 2014/0058596 A1 | 2/2014 | Martin et al. | |
| 2014/0171260 A1 | 6/2014 | Dalum | |
| 2015/0375735 A1* | 12/2015 | Fischer | G07C 5/0808 180/65.265 |
| 2018/0244266 A1 | 8/2018 | Habu | |

FOREIGN PATENT DOCUMENTS

| | | | | |
|---|---|---|---|---|
| JP | 2015527949 A | | 9/2015 | |
| WO | WO-2014079617 A1 | * | 5/2014 | ........... G01R 31/362 |
| WO | WO-2017162934 A1 | * | 9/2017 | ............ B60W 10/06 |

OTHER PUBLICATIONS

"Horsepower vs. Torque: What's the Difference?" Car and Driver, Don Sherman, Apr. 15, 2016 (Year: 2016).*
Machine translation of WO2014079617 downloaded from IP.com Feb. 12, 2025 (Year: 2025).*
Machine translation of WO2017162934 downloaded from IP.com Feb. 12, 2025 (Year: 2025).*
Japanese Office Action in English language, corresponding to application JP2022-564068, dated Oct. 31, 2023, 11 pages.
Patents Act 1977: Combined Search and Examination Report under Sections 17 and 18(3) corresponding to Great Britain Application No. GB2005813.7, dated Aug. 18, 2020, 6 pages.
Patents Act 1977: Examination Report under Sections 17 and 18(3) corresponding to Great Britain Application No. GB2213023.1, dated Oct. 7, 2022, 4 pages.
Patents Act 1977: Examination Report under Sections 17 and 18(3) corresponding to Great Britain Application No. GB2213028.0, dated Oct. 11, 2022, 4 pages.
PCT International Search Report and Written Opinion corresponding to PCT/EP2021/060418, dated Jul. 30, 2021, 11 pages.

* cited by examiner

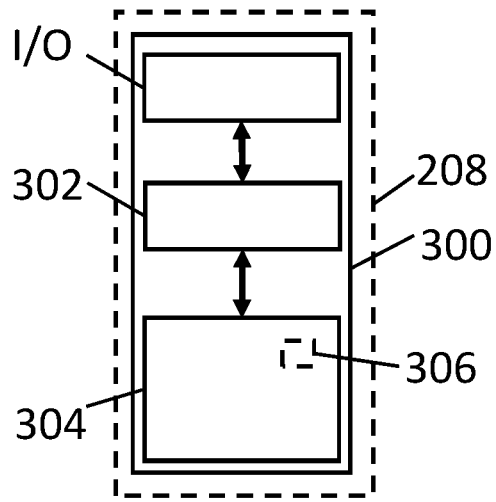
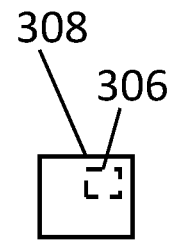
Fig 3A          Fig 3B
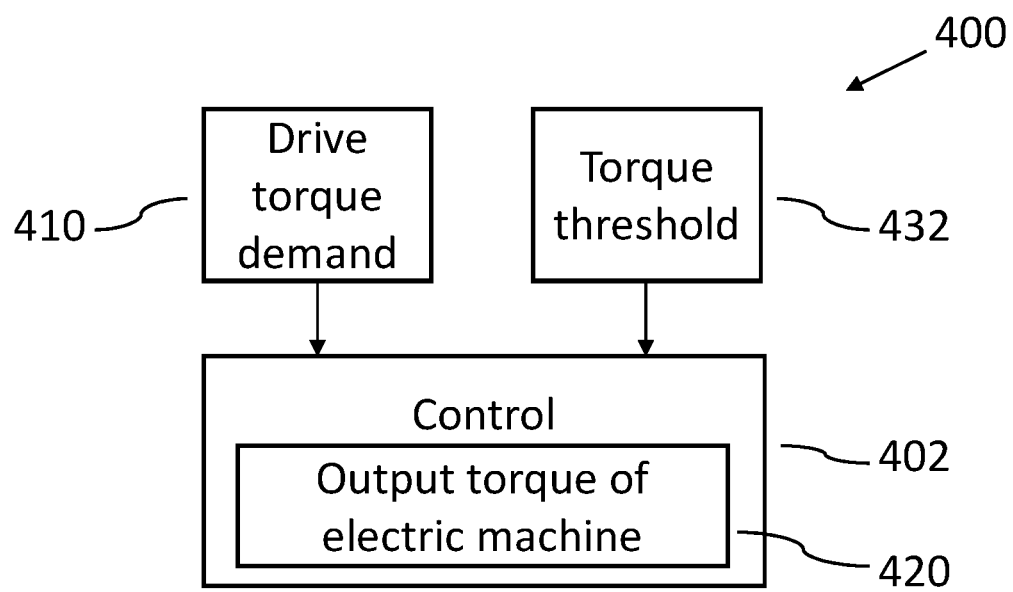
Fig 4

CONTROLLING AN ELECTRIC MACHINE TO SUPPORT DIAGNOSTIC TESTING

TECHNICAL FIELD

The present disclosure relates to controlling an electric machine to support diagnostic testing. In particular, but not exclusively, it relates to controlling an electric machine of a vehicle to support diagnostic testing of a vehicle system comprising an internal combustion engine of the vehicle.

BACKGROUND

On-board diagnostics may be required to run every time the car is driven. In the case of some diagnostic testing, the tests have to be performed soon after ignition. The internal combustion engine ("engine") must be running for the duration of the diagnostic testing. For hybrid electric vehicles (HEV) this can mean that the engine remains on for a prolonged period, even when there is sufficient electrical energy stored to enable the vehicle to be driven by electric traction motor(s) only. Thus, the engine can be running for no reason besides the diagnostic testing. This can be dissatisfying for vehicle owners who expect their HEV to run without the engine when the engine is not required for driving. If the duration of the diagnostic testing can be reduced, the engine can be switched off sooner.

SUMMARY OF THE INVENTION

It is an aim of the present invention to address one or more of the disadvantages associated with the prior art.

Aspects and embodiments of the invention provide control systems, systems, vehicles, methods, and computer software as claimed in the appended claims.

According to an aspect of the invention there is provided a control system for controlling at least one electric machine of a vehicle to support diagnostic testing of a vehicle system comprising an internal combustion engine, the control system comprising one or more electronic controllers, the one or more electronic controllers configured to: control a torque output of the at least one electric machine to allow a vehicle drive torque demand to be met while the internal combustion engine is operated within at least one torque threshold for the diagnostic testing.

By allowing the internal combustion engine to be operated within the at least one torque threshold for the diagnostic testing, the diagnostic testing can be performed without interruption and without delay. This provides the advantage that the internal combustion engine can be switched off sooner, saving fuel, reducing emissions, and satisfying the expectations of vehicle owners who do not expect the internal combustion engine to be running for a prolonged period when the vehicle is operated in a HEV mode.

Optionally, the control system may be configured to determine the at least one torque threshold based at least on a subject of the diagnostic testing.

The at least one torque threshold for the diagnostic testing may comprise an upper torque threshold for a torque output of the internal combustion engine.

Optionally, the control system may be configured to: control the at least one electric machine to provide positive torque when the vehicle drive torque demand is greater than the upper torque threshold.

The at least one torque threshold for the diagnostic testing may comprise a lower torque threshold for a torque output of the internal combustion engine.

Optionally, the control system may be configured to control the at least one electric machine to provide negative torque when the vehicle drive torque demand is less than the lower torque threshold.

Optionally, the control system may be configured to control the internal combustion engine to operate within the at least one torque threshold for the diagnostic testing.

Optionally, the control system may be configured to determine a capability of an electrical energy storage means of the vehicle to store or provide additional electrical energy. The control system may be configured to allow the internal combustion engine to operate outside of the at least one torque threshold based at least on the capability and the vehicle drive torque demand.

According to another aspect of the invention there is provided a control system for controlling at least one electric machine of a vehicle to support diagnostic testing of a vehicle system comprising an internal combustion engine, the control system comprising one or more electronic controllers, the one or more electronic controllers configured to: control a torque output of the at least one electric machine to allow a vehicle drive torque demand to be met while the internal combustion engine is operated at a torque setpoint for the diagnostic testing.

By allowing the internal combustion engine to be operated at the torque setpoint for the diagnostic testing, the diagnostic testing can be performed without interruption and without delay. This provides the advantage that the internal combustion engine can be switched off sooner, saving fuel, reducing emissions, and satisfying the expectations of vehicle owners who do not expect the internal combustion engine to be running for a prolonged period when the vehicle is operated in a HEV mode.

Optionally, the control system may be configured to determine the torque setpoint based at least on a subject of the diagnostic testing.

Optionally, the control system may be configured to: control the at least one electric machine to provide positive torque when the vehicle drive torque demand is greater than the torque setpoint; and control the at least one electric machine to provide negative torque when the vehicle drive torque demand is less than the torque setpoint.

Optionally, the control system may be configured to control the internal combustion engine to operate at the torque setpoint for the diagnostic testing.

Optionally, the control system may be configured to determine a capability of an electrical energy storage means of the vehicle to store or provide additional electrical energy. The control system may be configured to allow the internal combustion engine to diverge from the torque setpoint based at least on the capability and the vehicle drive torque demand.

The following portion of this "Summary of the Invention" section, describes various features that may be features of either of the aspects of the invention described in the foregoing portion of the "Summary of the Invention" section. The description of a function should additionally be considered to also disclose any means suitable for performing that function.

The aforementioned control of the internal combustion engine may be conditional upon an absence of an overriding request for operation of the vehicle in an off-road mode.

The at least one electric machine may comprise at least one from: a traction motor; a belt integrated starter generator; or a crankshaft integrated motor generator (also known as a crank integrated starter generator).

The one or more electronic controllers may collectively comprise: at least one electronic processor having an electrical input for receiving information; and at least one electric memory device electrically coupled to the at least one electronic processor and having instructions stored therein; and wherein the at least one electronic processor is configured to access the at least one memory device and execute the instructions thereon so as to cause the control system to control the torque output of the at least one electric machine.

The at least one electric machine may comprise an electric traction motor configured to drive an axle of the vehicle which is not mechanically coupled to the internal combustion engine.

Optionally, the control system(s) may be configured to control the electric traction motor configured to drive an axle of the vehicle which is not mechanically coupled to the internal combustion engine in order to provide positive torque to the axle of the vehicle which is not mechanically coupled to the internal combustion engine.

The at least one electric machine may comprise an electric motor mechanically coupled to the internal combustion engine. The electric motor coupled to the internal combustion engine may take the form a belt integrated starter generator (BISG) or a crank integrated motor generator (CIMG). In an example, the at least one electric machine comprises both a BISG and a CIMG.

Optionally, the control system(s) may be configured to control the electric machine mechanically coupled to the internal combustion engine in order to provide negative torque to the internal combustion engine.

Optionally, the control system(s) may be configured to determine a torque split between the at least one electric machine and the internal combustion engine. The torque split may in combination meet the vehicle drive torque demand. The torque split may enable a torque output of the internal combustion engine to vary with the vehicle drive torque demand under a stabilisation function. The stabilisation function may be configured to limit a rate of change of the torque output of the internal combustion engine.

According to a further aspect of the invention there is provided a system comprising one of the aforementioned control systems and the at least one electric machine.

According to a further aspect of the invention there is provided a vehicle comprising one of the aforementioned control systems, or the system.

According to a further aspect of the invention there is provided a method of controlling at least one electric machine of a vehicle to support diagnostic testing of a vehicle system comprising an internal combustion engine, wherein the method comprises: controlling a torque output of the at least one electric machine to allow a vehicle drive torque demand to be met while the internal combustion engine is operated within at least one torque threshold for the diagnostic testing.

According to a further aspect of the invention there is provided a method of controlling at least one electric machine of a vehicle to support diagnostic testing of a vehicle system comprising an internal combustion engine, wherein the method comprises: controlling a torque output of the at least one electric machine to allow a vehicle drive torque demand to be met while the internal combustion engine is operated at a torque setpoint for the diagnostic testing.

According to a further aspect of the invention there is provided computer software that, when executed, is arranged to perform one of the aforementioned methods. According to a further aspect of the invention there is provided a non-transitory computer readable medium comprising computer readable instructions that, when executed by a processor, cause performance of any one or more of the methods described herein.

Within the scope of this application it is expressly intended that the various aspects, embodiments, examples and alternatives set out in the preceding paragraphs and/or in the following description and drawings, and in particular the individual features thereof, may be taken independently or in any combination that falls within the scope of the appended claims. That is, all embodiments and/or features of any embodiment can be combined in any way and/or combination that falls within the scope of the appended claims, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIGS. 3A, 3B illustrate an example of a control system and of a non-transitory computer-readable storage medium;
FIG. 4 illustrates an example of a method.

DETAILED DESCRIPTION

Figure 1:
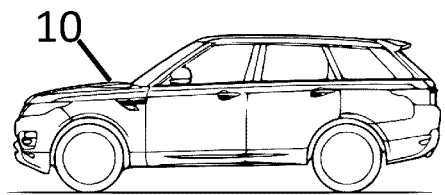
FIG. 1 illustrates an example of a vehicle.

FIG. 1 illustrates an example of a vehicle 10 in which embodiments of the invention can be implemented. In some, but not necessarily all examples, the vehicle 10 is a passenger vehicle, also referred to as a passenger car or as an automobile. In other examples, embodiments of the invention can be implemented for other applications, such as industrial vehicles.

The vehicle 10 is a hybrid electric vehicle (HEV). The vehicle 10 may be a full HEV or a mild HEV. Mild HEVs do not have an electric-only mode of propulsion, but the electric traction motor may be configured to provide assistance such as boosting output torque of the engine. Full HEVs have an electric-only mode of propulsion.

The vehicle 10 may be configured to operate as a parallel HEV. Parallel HEVs comprise a torque path between the engine and at least one vehicle wheel, as well as a torque path between an electric machine, such as a traction motor, and at least one vehicle wheel. The torque path(s) may be disconnectable by a torque path connector such as a clutch.

Typically, parallel HEVs differ from series HEVs, because in series HEVs the purpose of the engine is to generate electrical energy and there is no torque path between the engine and vehicle wheels. However, some types of parallel HEVs may be configurable to operate as a series HEV, such as 'Through-the-road' hybrids. In this case we may usefully describe such a hybrid vehicle as operating in a parallel HEV mode or in a series HEV mode, depending on whether torque is being delivered from the engine directly to the vehicle wheels.

Figure 2:
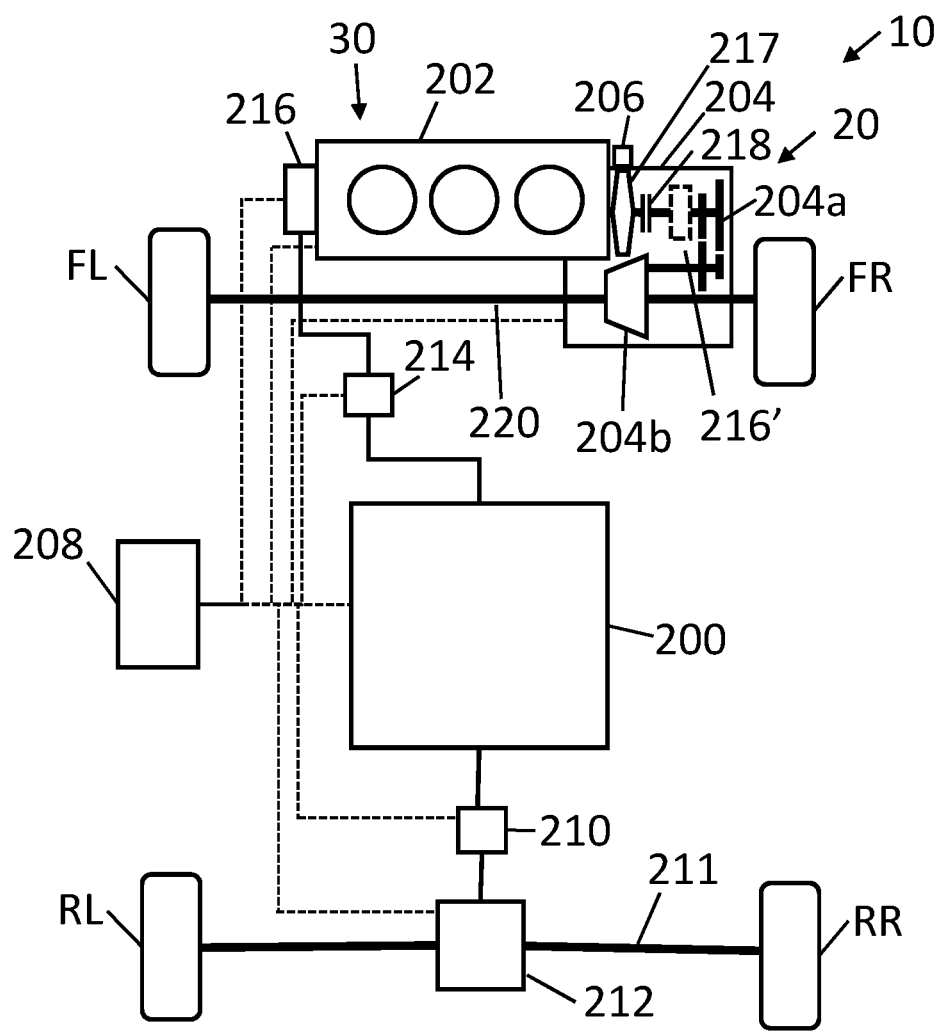
FIG. 2 illustrates an example of a system.

FIG. 2 illustrates a system 20 for an HEV 10. The system 20 defines, at least in part, a powertrain of the HEV.

The system 20 comprises a control system 208. The control system 208 comprises one or more controllers. The control system 208 may comprise one or more of: a hybrid powertrain control module; an engine control unit; a transmission control unit; a traction battery management system; and/or the like.

The system 20 comprises one or more torque sources. A torque source refers to a prime mover, such as an internal combustion engine, an electric machine such as a traction motor, or the like. The illustrated system 20 comprises an internal combustion engine 202. The illustrated engine 202 is an internal combustion engine. The illustrated engine 202 comprises three combustion chambers, however a different number of combustion chambers may be provided in other examples.

The engine 202 is operably coupled to the control system 208 to enable the control system 208 to control output torque of the engine 202. The output torque of the engine 202 may be controlled by controlling one or more of: air-fuel ratio; spark timing; poppet valve lift; poppet valve timing; throttle opening position; fuel pressure; turbocharger boost pressure; and/or the like, depending on the type of engine 202.

The system 20 comprises a vehicle transmission arrangement 204 (transmission) for receiving output torque from the engine 202. The vehicle transmission arrangement 204 may comprise an automatic vehicle transmission, a manual vehicle transmission, or a semi-automatic vehicle transmission. The vehicle transmission arrangement 204 may comprise one or more torque path connectors 218, a torque converter 217, and a gear train 204a. The gear train 204a is configured to provide a selected gear reduction in accordance with a selected gear of the vehicle 10. The gear train 204a may comprise five or more different selectable gear reductions. The gear train 204a may comprise at least one reverse gear.

The system 20 may comprise a differential 204b which is a second gear train for receiving output torque from the gear train 204a. The differential 204b may be integrated into the vehicle transmission arrangement 204 as a transaxle, or provided separately. In some examples, a gear reduction of the differential 204b is selectable.

The engine 202 is mechanically connected (coupled) or connectable (couplable) to a first set of vehicle wheels (FL, FR) via a torque path 220. The torque path 220 extends from an output of the engine 202 to the vehicle transmission arrangement 204, then to axles/driveshafts, and then to first set of vehicle wheels (FL, FR). In a vehicle overrun and/or friction braking situation, torque may flow from the first set of vehicle wheels (FL, FR) to the engine 202. Torque flow towards the first set of vehicle wheels (FL, FR) is positive torque, and torque flow from the first set of vehicle wheels (FL, FR) is negative torque.

The illustrated first set of vehicle wheels (FL, FR) comprises front wheels, and the axles are front transverse axles. Therefore, the system 20 is configured for front wheel drive by the engine 202. The illustrated first set of vehicle wheels (FL, FR) is a pair of vehicle wheels, however a different number of vehicle wheels could be provided in other examples. In another example, not shown, a set of wheels driven by the internal combustion engine comprise a pair of rear wheels couples to a rear axle.

In the illustrated system 20, no longitudinal (centre) driveshaft or propshaft is provided, to make room for hybrid vehicle components. Therefore, in the example shown, the engine 202 is not mechanically connectable to a second set of rear wheels (rear wheels RL, RR in the illustration). The engine 202 may be transverse mounted to save space. In an alternative example, the engine 202 may be configured to drive the front and rear wheels.

A torque path connector 218 such as a clutch is provided inside and/or outside a bell housing of the vehicle transmission arrangement 204. The clutch 218 is configured to connect and configured to disconnect the torque path 220 between the engine 202 and the first set of vehicle wheels (FL, FR). The torque path connector 218 may be a part of the torque converter 217 or gear train 204a, or may be a separate friction clutch. The system 20 may be configured to automatically actuate the torque path connector 218 without user intervention.

The system 20 comprises at least one electric machine. The at least one electric machine is an electric motor arranged to convert electrical energy into kinetic energy in the form of mechanical torque and vice versa. The electric motor may be an alternating current induction motor or a permanent magnet motor, or another type of motor. In the example shown, a first electric machine takes the form of a belt integrated starter motor otherwise referred to as a belt integrated starter generator (BISG) 216, mechanically coupled to a crankshaft (not shown) of the engine 202 and located to the engine side of the clutch 218.

The BISG 216 is mechanically coupled to the engine 202 via a belt or chain. The BISG 216 and the engine 202 together form a torque source for the first set of vehicle wheels (FL, FR). In the illustration, the BISG 216 is located at an accessory drive end of the engine 202, opposite a vehicle transmission end of the engine 202. In an alternative example, the first electric machine takes the form of a crankshaft integrated motor generator (CIMG) 216', located at a vehicle transmission end of the engine 202. In the Figure, CI MG 216' is shown in phantom. There may be provided another clutch to the gear train side of the CIMG 216' to enable the CIMG 216' to be decoupled from the gear train, though this is not shown in FIG. 2. It will be appreciated that, whilst it is possible to provide a vehicle engine 202 with both a BISG 216 and a CI MG 216', it is seldom necessary to incur the cost and weight penalty of providing both forms of electric machines when the vehicle can be optimized with just one. The control strategy described herein is equally applicable if the first electric machine is in the form of a BISG or a CIMG and as such the first electric machine will be referred to as electric machine 216 and is intended to cover an electric motor that is coupled to the engine 202 and capable of providing positive torque to crank the engine 202 to start it and to augment the amount of torque the engine can provide to the wheels in use.

The first electric machine 216 is configured to apply positive torque and configured to apply negative torque to a crankshaft of the engine 202, for example to provide functions such as: boosting output torque of the engine 202; facilitating the deactivation (shutting off) of the engine 202 during a vehicle stop or coasting event; activating (starting/cranking) the engine 202; and/or regenerative braking in a regeneration mode. In a hybrid electric vehicle mode, the engine 202 and first electric machine 216 may both be operable to supply positive torque simultaneously to boost output torque. The first electric machine 216 may be incapable of sustained electric-only driving. In an alternative example, the first electric machine 216 is not controllable to provide positive torque other than to start the engine 202. In further examples, a pinion starter 206 is provided for starting the engine 202.

When the torque path 220 between the engine 202 and the first set of vehicle wheels (FL, FR) is disconnected, a torque path 220 between the first electric machine 216 and the first set of vehicle wheels (FL, FR) is also disconnected.

FIG. 2 illustrates a second electric machine in the form of a traction motor 212 configured to enable at least an electric vehicle mode comprising electric-only driving. Another term for the second electric machine 212 is an electric drive unit (EDU). In some, but not necessarily all examples, a nominal maximum torque of the second electric machine 212 is greater than a nominal maximum torque of the first electric machine 216. The second electric machine 212 may be arranged to drive an axle independently of the internal combustion engine 202. The electric drive unit may form part of a rear axle as in the case shown in the Figure, or may alternatively form part of a front axle of the vehicle 10.

Even if the torque path 220 between the engine 202 and the first set of vehicle wheels (FL, FR) is disconnected, the vehicle 10 can be driven in electric vehicle mode because the second electric machine 212 is connected to at least one vehicle wheel.

The illustrated second electric machine 212 is configured to provide torque to the illustrated second set of vehicle wheels (RL, RR). The second set of vehicle wheels (RL, RR) comprises vehicle wheels not from the first set of vehicle wheels (FL, FR). The illustrated second set of vehicle wheels (RL, RR) comprises rear wheels, and the second electric machine 212 is operable to provide torque to the rear wheels RL, RR via rear transverse axles 211. These axles 211 may not be mechanically coupled or couplable to the internal combustion engine 202. Therefore, the vehicle 10 is rear wheel driven in electric vehicle mode.

The control system 208 may be configured to disconnect the torque path 220 between the engine 202 and the first set of vehicle wheels (FL, FR) in electric vehicle mode, to reduce parasitic pumping energy losses. For example, the clutch 218 may be opened. In the example of FIG. 2, this means that the first electric machine 216 will also be disconnected from the first set of vehicle wheels (FL, FR).

Another benefit of the second electric machine 212 is that the traction motor 212 may also be configured to operable in a hybrid electric vehicle mode, to enable four-wheel drive operation despite the absence of a centre driveshaft or propshaft.

In order to store electrical energy for the electric machines, the system 20 comprises an electrical energy storage means 200. The electrical energy storage means 200 can be a traction battery. The traction battery 200 provides a nominal voltage required by electrical power users such as the electric machines. If the electric machines operate using different voltages, DC-DC converters (not shown) or the like may be provided to convert voltages.

The traction battery 200 may be a high voltage battery. High voltage traction batteries provide nominal voltages in the hundreds of volts, as opposed to traction batteries for mild HEVs which provide nominal voltages in the tens of volts. The traction battery 200 may have a voltage and capacity to support electric only driving for sustained distances. The traction battery 200 may have a capacity of several kilowatt-hours, to maximise range. The capacity may be in the tens of kilowatt-hours, or even over a hundred kilowatt-hours.

Although the traction battery 200 is illustrated as one entity, the function of the traction battery 200 could be implemented using a plurality of small traction batteries in different locations on the vehicle 10.

In some examples, the first electric machine 216 and second electric machine 212 may be configured to receive electrical energy from the same traction battery 200. By pairing the first (mild) electric machine 216 to a high-capacity battery (tens to hundreds of kilowatt-hours), the first electric machine 216 may be able to provide the functionality of the methods described herein for sustained periods of time, rather than for short bursts. In another example, the electric machines 212, 216 may be paired to different traction batteries.

Torque from the engine 202 may be used by the BISG 216 and/or CI MG 216' to generate electricity to charge the traction battery 200. Additionally, it will be appreciated that when the vehicle is coasting or otherwise in overrun, the traction motor 212 may also act as a generator, converting the kinetic energy at the wheels into electrical energy which may also be supplied to the traction battery to increase its state of charge.

Finally, the illustrated system 20 comprises inverters. Two inverters 210, 214 are shown, one for each electric machine. In other examples, one inverter or more than two inverters could be provided.

In some examples, the electrical coupling of the first electric machine 216 and the second electric machine 212 to a same traction battery 200 enables the vehicle 10 to operate in both parallel and series HEV modes. In series HEV mode, the first electric machine 216 is configured to generate electrical energy from the engine 202 while the torque path 220 is disconnected. The electrical energy is provided to the second electric machine 212. In parallel HEV mode, the engine 202 drives the first set of wheels FL, FR and the second electric machine drives the second set of wheels RL, RR.

In an alternative implementation, the vehicle 10 may be other than shown in FIG. 2.

FIG. 3A illustrates how the control system 208 may be implemented. The control system 208 of FIG. 3A illustrates a controller 300. In other examples, the control system 208 may comprise a plurality of controllers on-board and/or off-board the vehicle 10.

The controller 300 of FIG. 3A includes at least one processor 302; and at least one memory device 304 electrically coupled to the electronic processor 302 and having instructions 306 (e.g. a computer program) stored therein, the at least one memory device 304 and the instructions 306 configured to, with the at least one processor 302, cause any one or more of the methods described herein to be performed. The processor 302 may have an electrical input/output I/O or electrical input for receiving information and interacting with external components.

FIG. 3B illustrates a non-transitory computer-readable storage medium 308 comprising the instructions 306 (computer software).

The control system 208 may be configured to provide controller outputs to manipulate a variable (torque) towards a setpoint. An example setpoint is a torque target or a speed target.

Output torque may be manipulated to satisfy at least one torque request. A torque request may be a load for propelling the vehicle 10. A load may be based on a vehicle drive torque demand such as: torque demanded by a driver of the vehicle 10 (e.g. torque setpoint based on accelerator pedal depression APD, or throttle position), and/or a torque demand which is dependent on a speed setpoint such as a cruise control speed setpoint.

The torque request may comprise an engine torque request for controlling output torque of the engine. The torque request may comprise an electric machine torque request for controlling output torque of one or more electric machines. A distribution function may modify the torque requests to control a front:rear torque split between the engine 202 and the second electric machine 212, to provide front-biased, rear-biased or neutral vehicle handling.

Arbitration functions may be applied to change/increase the torque request(s) to satisfy a plurality of torque requests including load and requests from other vehicle subsystems.

Shaping functions may be applied to smooth a torque request(s) that changes at a high rate or crosses zero (lash crossing), resulting in a shaped torque request.

A system 20 such as the powertrain of FIG. 2 can be operated in a plurality of vehicle modes. In one or more modes, the engine 202 is deactivated and the torque path 220 between the engine 202 and the first set of vehicle wheels (FL, FR) is disconnected. In another one or more modes, the engine 202 is re-activated and the torque path 220 is re-connected.

In electric vehicle mode, the engine 202 is in a deactivated state and the torque path 220 between the first set of vehicle wheels (FL, FR) and the engine 202 and first electric machine 216 is disconnected. In an example, the effect of the combined deactivation and disconnection is that engine speed falls towards zero. Deactivation relates to the engine 202 producing no positive output torque or insufficient positive output torque for driving. Fuel injection may cease, to reduce fuel consumption.

In series HEV mode, the engine 202 is in an activated state but the torque path 220 is disconnected. With torque provided by the engine 202, the first electric machine 216 generates electrical power, whilst the second electric machine 212 provides torque to the second set of vehicle wheels (RL, RR). In vehicles provided with a CIMG 216', it is also possible for both electric machines 212, 216' to provide torque to vehicle wheels at the same time, affording the vehicle an electric only all-wheel drive mode of operation.

In the parallel HEV mode or internal combustion engine mode, the engine 202 is in an activated state and the torque path 220 is connected. In the activated state, fuel is combusted in the engine's combustion chambers, causing the engine 202 to provide positive output torque to the torque path 220. The engine 202 and the first electric machine 216 may optionally generate electrical power.

In an internal combustion engine mode, the engine 202 is in an activated state and the torque path 220 is connected. However, the first and second electric machines 212, 216 are not operable as motors to provide torque to the vehicle wheels. The engine 202 and the first electric machine 216 may optionally generate electrical power. The second electric machine 212 may optionally generate electrical power.

The vehicle mode may be selectable manually, semi-automatically, or automatically. A transition condition for changing to a vehicle mode that allows more charging than a current mode (e.g. exit electric vehicle mode and/or enter series hybrid electric vehicle mode and/or the internal combustion engine mode) may require at least one of: a manual user selection; a traction battery state of charge falling below a threshold; torque request rising above a threshold (e.g. kickdown function); a temperature being below a threshold (e.g. freezing weather); a change of driving dynamics mode; a change of terrain mode or a vehicle mode optimized for driving over a particular driving surface (driving surface optimization mode); and/or the like. A terrain mode may be arranged to improve traction the vehicle for driving over off-road terrain such as may be required when traversing areas of grass, gravel, sand, mud or even crawling over rocks. A driving surface optimization mode may be arranged to improve traction the vehicle for driving over low friction surfaces such as snow or ice covered surfaces, either on or off road.

A transition condition for changing to a vehicle operating mode that allows more net torque than a current mode and/or all-wheel drive (e.g. parallel hybrid electric vehicle mode) may require at least one of: a manual user selection; a torque request rising above a threshold (e.g. kickdown function); a change of driving dynamics mode; a change of terrain mode or a vehicle mode optimized for driving over a particular driving surface; and/or the like.

A transition condition for changing to a vehicle mode that allows more electric driving than a current mode (e.g. one of the hybrid electric vehicle modes or the electric vehicle mode) may require at least one of: a manual user selection; a traction battery state of charge rising above a threshold; torque request falling below a threshold; a temperature being above a threshold; a change of driving dynamics mode; a change of terrain mode or a driving surface optimization mode; and/or the like.

A driving dynamics mode refers to a mode that configures one or more of: a suspension setting; a throttle response setting; a gear shift point setting; or a steering weighting setting. A terrain mode or driving surface optimization mode, refers to a mode that configures one or more of: a differential locking setting; a traction control setting; an accelerator pedal sensitivity setting; a ride height setting; a suspension damper setting. There may be overlap between driving dynamics modes and terrain or driving surface optimization modes. The settings may be predetermined or configurable.

A manual user selection may comprise use of a human-machine interface input device. The input device may comprise an engine start button. The input device may comprise a driving dynamics mode selector. The input device may comprise a terrain or driving surface optimization mode selector. In some examples, a terrain or driving surface optimization mode and/or driving dynamics mode may be changeable automatically.

In accordance with an aspect of the invention, FIG. 4 illustrates an example implementation of a computer-implemented method 400. The method 400 can be performed by the control system 208. The method 400 is for controlling at least one electric machine 212, 216 of the vehicle 10 to support diagnostic testing of a vehicle system 30 comprising the internal combustion engine 202. Additionally or alternatively, the vehicle system 30 may comprise an exhaust after-treatment system of the vehicle 10. The diagnostic testing supported by this method may comprise diagnostic testing of the internal combustion engine 202 and/or after-treatment components of the exhaust system. The vehicle system 30 can comprise other systems which require periodic diagnostics.

At block 402 of the method 400, a torque output 420 of the at least one electric machine 212, 216 is controlled in order to allow a vehicle drive torque demand 410 to be met while the internal combustion engine 202 is operated within at least one torque threshold 432 for the diagnostic testing.

By allowing the internal combustion engine 202 to be operated within the at least one torque threshold 432 for the diagnostic testing, the diagnostic testing can be performed without interruption and without delay. Such a delay can, for example, be due to waiting for the output torque of the internal combustion engine 202 to incidentally fall within the at least one torque threshold 432 for the diagnostic testing. This can take a prolonged period, especially if, for example, the vehicle 10 is in traffic soon after the start of the journey, or is otherwise being driven in a manner incompatible with the uninterrupted completion of the diagnostic test.

As a result, the internal combustion engine 202 can be switched off sooner, saving fuel, reducing emissions, and satisfying the expectations of vehicle owners who do not expect the internal combustion engine 202 to be running for a prolonged period when the vehicle is operated in a HEV mode and has sufficient charge in the electrical energy storage means 200.

The diagnostic testing may be emissions related. The diagnostic testing may detect faults in the vehicle system 30 that can result in the failure of the vehicle to meet its emissions targets.

The at least one torque threshold 432 may correlate to an engine load which is suitable for monitoring parameters of a subject of the diagnostic testing.

In some examples of the method 400, the at least one torque threshold 432 can be determined based at least on the subject of the diagnostic testing. That is, for different e.g. systems, components, or conditions, which are the subject of the diagnostic testing, there may be different torque thresholds 432 within which the internal combustion engine 202 is to be operated.

For example, diagnostic testing can be performed to monitor at least: mass flow stability, fuel cut off, catalyst purge, lambda stability, and engine speed, when the internal combustion engine 202 is operated within 80 and 150 Nm.

For example, diagnostic testing can be performed to monitor at least: exhaust gas temperature, mass flow stability, fuel cut off, catalyst purge, exhaust mass flow, and integrated exhaust mass, when the internal combustion engine 202 is operated within 90 and 190 Nm.

For example, diagnostic testing can be performed to monitor at least: exhaust gas temperature, mass flow stability, fuel cut off, catalyst purge, lambda stability, engine speed, exhaust mass flow, and integrated exhaust mass, when the internal combustion engine 202 is operated within 60 and 190 Nm.

It is to be appreciated that enabling the internal combustion engine 202 to operate within at least one threshold 432 can comprise enabling output torque of operating the internal combustion engine 202 to be above a torque threshold, to be below a torque threshold, or to be within a torque window between two torque thresholds. Therefore, block 402 of the method 400 can comprise:
controlling the torque output 420 of the at least one electric machine 212, 216 to be greater than the value of the vehicle drive torque demand 410 minus an upper torque threshold;
controlling the torque output 420 of the at least one electric machine 212, 216 to be less than the value of the vehicle drive torque demand 410 minus a lower torque threshold; or
controlling the torque output 420 of the at least one electric machine 212, 216 to be between the value of the vehicle drive torque demand 410 minus an upper torque threshold and the value of the vehicle drive torque demand 410 minus a lower torque threshold.

In some examples, the upper and lower toque thresholds can be determined based at least on the subject of the diagnostic testing.

Figure 5:
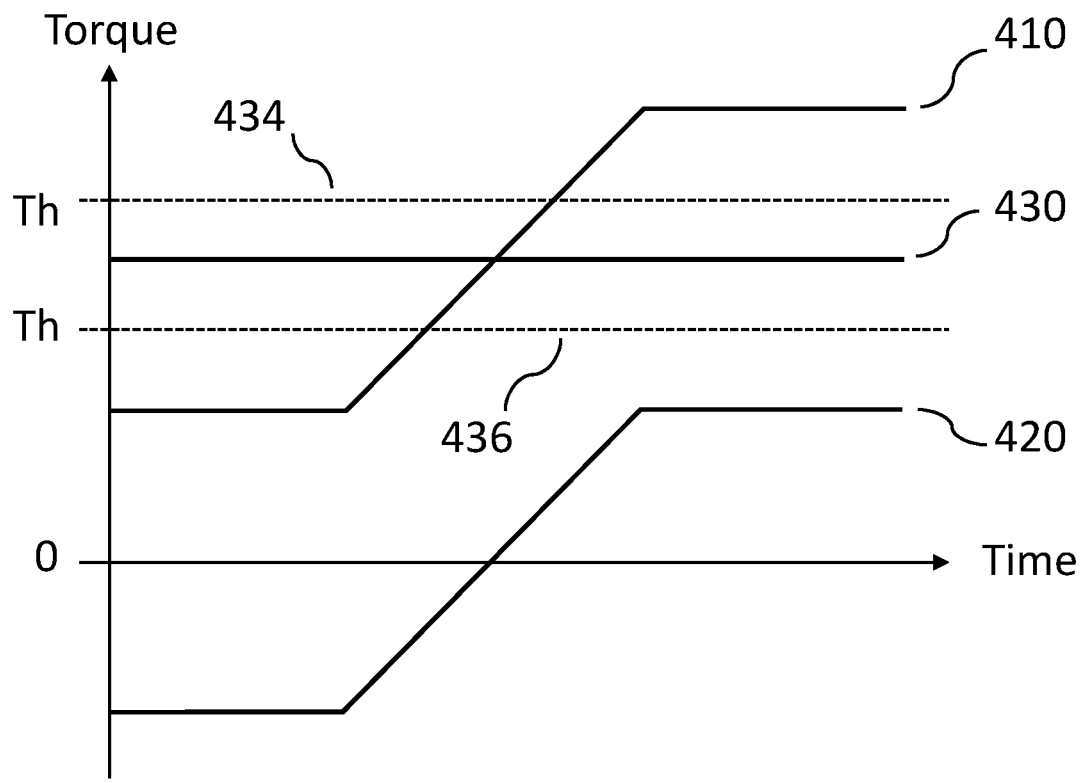
FIG. 5 illustrates a graph according to an example of the disclosure.

FIG. 5 shows torque in the y-axis with respect to time in the x-axis. In FIG. 5, it can be seen that the vehicle drive torque demand 410 is initially less than a lower torque threshold 436 with which the internal combustion engine 202 is to be operated for the diagnostic testing. To enable the torque output 430 of the internal combustion engine 202 to be greater than this lower torque threshold 436 while the vehicle drive torque demand 410 is met, the at least one electric machine 212, 216 is controlled to provide negative torque. Negative torque may be in the form of regenerative torque, wherein kinetic energy is converted into electrical energy to be stored in the electrical energy storage means 200.

As the vehicle drive torque demand 410 rises, it may become greater than an upper torque threshold 434 with which the internal combustion engine 202 is to be operated for the diagnostic testing. This example is shown in FIG. 5. When the vehicle drive torque demand 410 is greater than the upper torque threshold 434, the at least one electric machine 212, 216 is controlled to provide positive torque. Positive torque may be in the form of driving torque, wherein electrical energy (which may be stored in the electrical energy storage means 200) is converted into kinetic energy by the at least one electric machine 212, 216.

Therefore, the internal combustion engine 202 is free to meet the at least one torque threshold requirements of the diagnostic testing and any difference between the at least one torque threshold 432 for the diagnostic testing and the vehicle drive torque demand 410 is provided by the torque output 420, being either positive or negative, of the at least one electric machine 212, 216.

Figure 6:
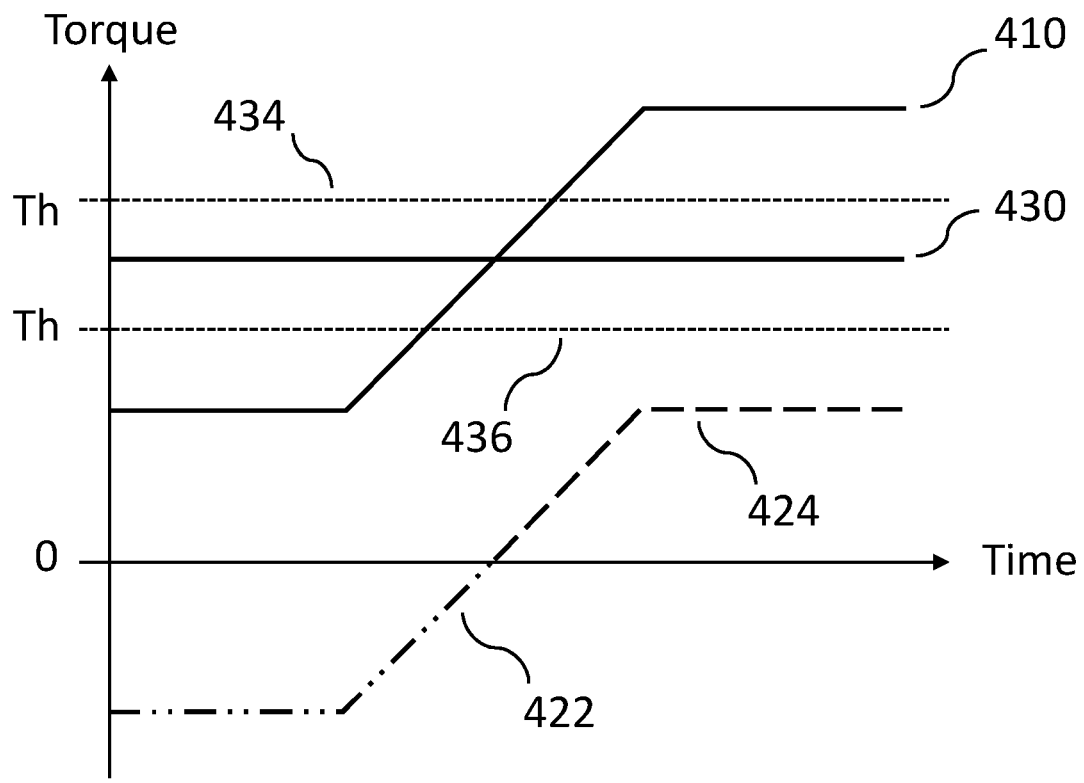
FIG. 6 illustrates a graph according to an example of the disclosure.

Like FIG. 5, FIG. 6 shows torque in the y-axis, with respect to time in the x-axis. FIG. 6 illustrates a graph according to an example in which two electric machines are used. That is, the at least one electric machine 212, 216 comprises an electric motor which is mechanically coupled to the internal combustion engine 202 (for example, the first electric machine 216), and comprises an electric machine configured to drive an axle 211 of the vehicle 10 which is not mechanically coupled to the internal combustion engine 202 (for example, the second electric machine is an electric traction motor 212). One of the electric machines is used to provide a negative torque output 422 and the other of the electric machines is used to provide positive torque output 424.

In some examples the electric machine which is mechanically coupled to the internal combustion engine 202 (for example the BISG 216 or CIMG 216') is controlled in order to provide negative torque to the internal combustion engine 202. The negative torque output 422 of this first electric machine 216, 216' provides the negative torque to the internal combustion engine 202. As such, the internal combustion engine 202 can be operated at a higher torque than the vehicle drive torque demand 410.

In some examples the electric traction motor 212 configured to drive the axle 211 of the vehicle 10 which is not mechanically coupled to the internal combustion engine 202 is controlled in order to provide positive torque to the axle 211. The positive torque output 424 of this second electric machine 212 provides the positive torque to the axle 211. As such, the internal combustion engine 202 can be operated at a lower torque than the vehicle drive torque demand 410.

Either of the first and second electric machines 212, 216 can be individually capable of providing both the negative torque output 422 and positive torque output 424. However, in some examples the first electric machine may not be controllable to provide positive torque other than to start the engine 202. This may be as a result of legislation rather than technical capability. Alternatively or additionally, in some examples controlling the second electric machine 212 to provide negative torque, may, in some circumstances, adversely affect vehicle composure by affecting vehicle stability. For example, controlling the second electric machine 212 to provide the negative torque output 422 may comprise applying a braking effect to the axle 211 of the vehicle 10. In some driving scenarios, it may not be desirable to apply a braking effect to the axle 211, for example while driving around a bend.

Thus, providing a combination of the first electric machine 216, supplying the negative torque output 422, and the second electric machine 212, supplying the positive torque output 424, advantageously enables the vehicle drive torque demand 410 to be reliably met while the internal combustion engine 202 is operated within the at least one torque threshold 432 for diagnostic testing.

Figure 7A:
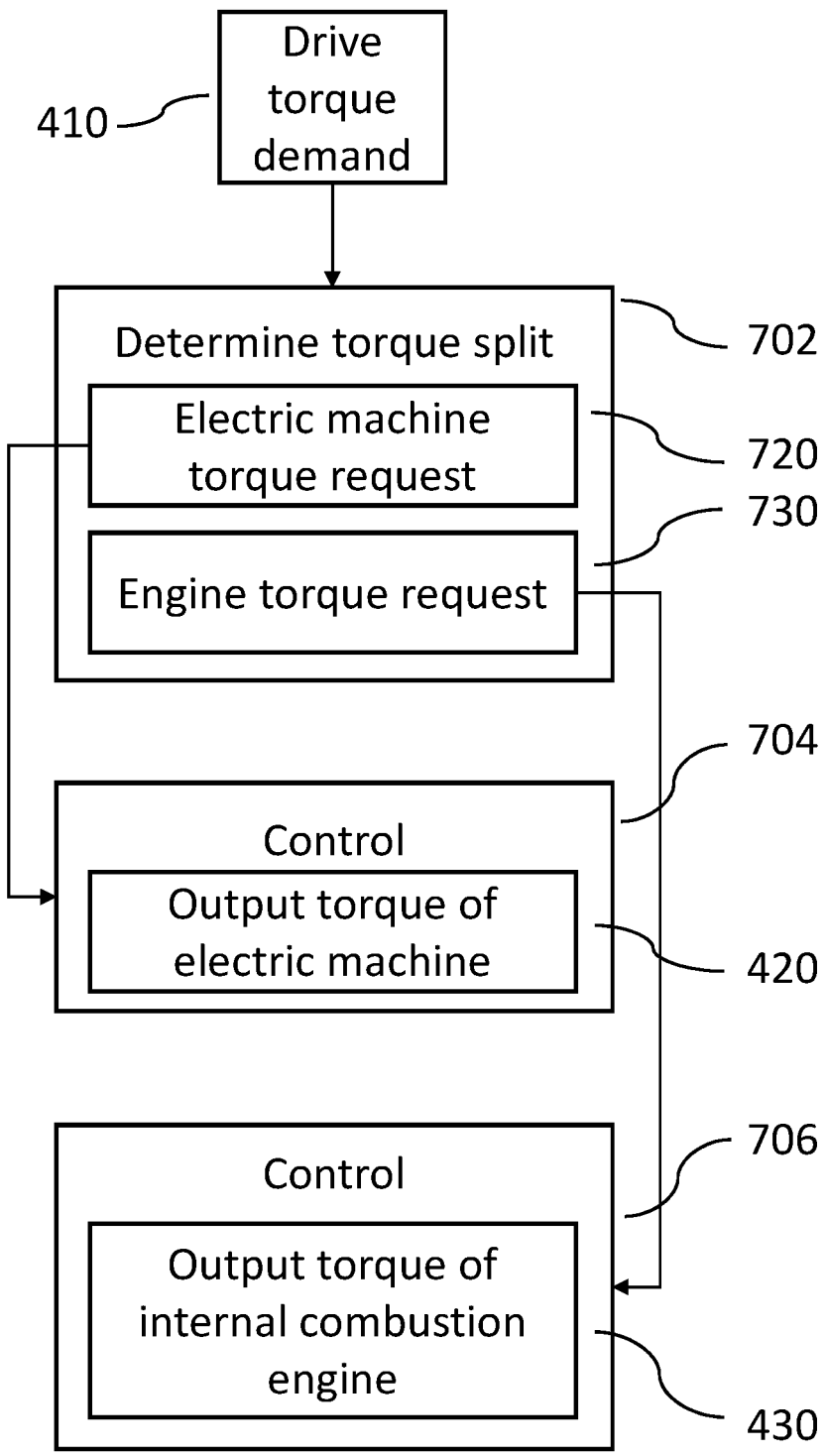
FIG. 7A illustrates an example of blocks in a method.

FIG. 7A illustrates optional sub-routines of block 402 of the method 400.

At block 702 a torque split between the at least one electric machine 212, 216 and the internal combustion engine 202 is determined. The torque split is based upon the vehicle drive torque demand 410. The torque split in combination meets the vehicle drive torque demand 410. The torque split provides an electric machine torque request 720 for controlling the output torque 420 of the at least one electric machine 212, 216. The torque split also provides an engine torque request 730 for controlling the output torque 430 of the internal combustion engine 202.

At block 704 the at least one electric machine 212, 216 is controlled to provide the torque output 420 in accordance with the electric machine torque request 720.

At block 706 the internal combustion engine 202 is controlled to provide the torque output 430 in accordance with the engine torque request 730.

Figure 7B:
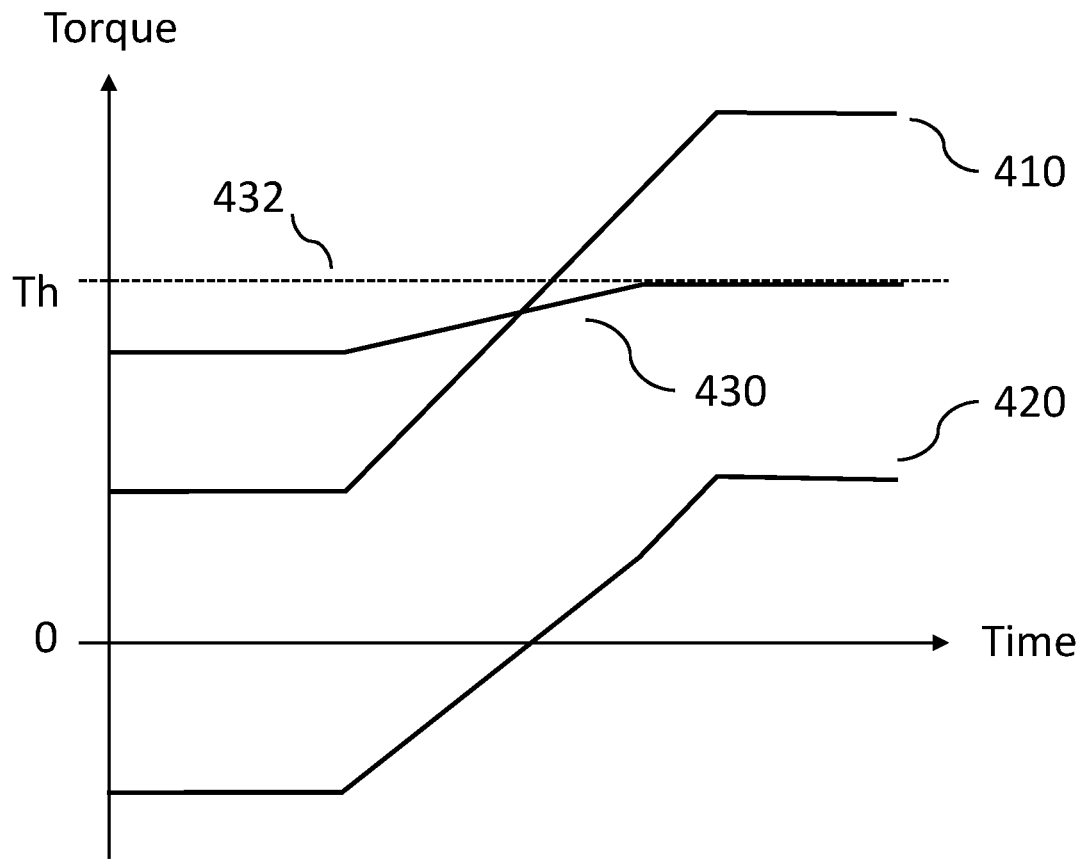
FIG. 7B illustrates a graph according to an example of the disclosure.

FIG. 7B shows torque in the y-axis, with respect to time in the x-axis. As shown in FIG. 7B the torque output 430 of the internal combustion engine 202 varies with the vehicle drive torque demand 410, though the rate of change of the torque output 430 of the internal combustion engine 202 is limited and the internal combustion engine 202 is still controlled to operate within the at least one torque threshold 432 for the diagnostic testing.

The torque split determined in block 702 of FIG. 7A enables the torque output 430 of the internal combustion engine 202 to vary with the vehicle drive torque demand 410 under a stabilization function. This stabilization function is configured to limit the rate of change of the torque output 430 of the internal combustion engine 202.

By allowing the torque output 430 of the internal combustion engine 202 to vary under a stabilization function and within the at least one torque threshold 432, the internal combustion engine 202 is able to assist with a response to a change in vehicle drive torque demand 410 without extending the period of time required to complete the diagnostic testing.

In some examples, other vehicle operations may take precedence over the method 400.

Figure 8:
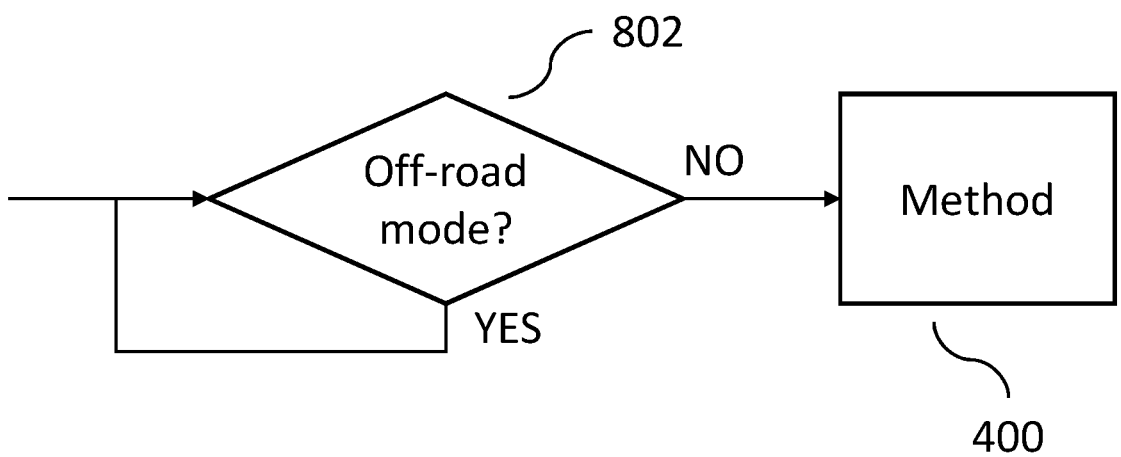
FIG. 8 illustrates an example of blocks in a method.

FIG. 8 illustrates an example in which off-road mode or an off-road suitable terrain mode or driving surface optimization mode takes precedence over the method 400.

Block 802 represents an assessment of whether entry condition(s) for the method 400 are met.

In block 802, it is determined whether the vehicle 10 is in an off-road mode or an off-road-suitable terrain mode or driving surface optimization mode. If so, the method 400 is not performed. The diagnostic testing may still be performed, however there may be no control which reliably allows the internal combustion engine 202 to operate within the at least one torque threshold 432 whilst the vehicle drive torque demand 410 is met. As a result, the diagnostic testing may be slower but the off-road mode or off-road-suitable terrain mode or driving surface optimization mode is not compromised by additional constraints on the control of the internal combustion engine 202.

On the other hand, if at block 802 it is determined that the vehicle 10 is not in an off-road mode or in an off-road-suitable terrain mode or driving surface optimization mode, the method 400 can be performed and the diagnostic testing can accordingly be performed quicker.

Thus, the control of the internal combustion engine 202 to operate within the at least one torque threshold 432 can be considered conditional upon an absence of an overriding request for operation of the vehicle 10 in an off-road mode or in an off-road-suitable terrain mode or in a driving surface optimization mode.

In some examples the ability to use the at least one electric machine 212, 216 to provide sufficient positive or negative torque to meet the vehicle drive torque demand 410 whilst the internal combustion engine 202 is operated within the at least one torque threshold 432, is dependent upon a capability of the electrical energy storage means 200 of the vehicle 10 to store or provide additional electrical energy.

Figure 9:
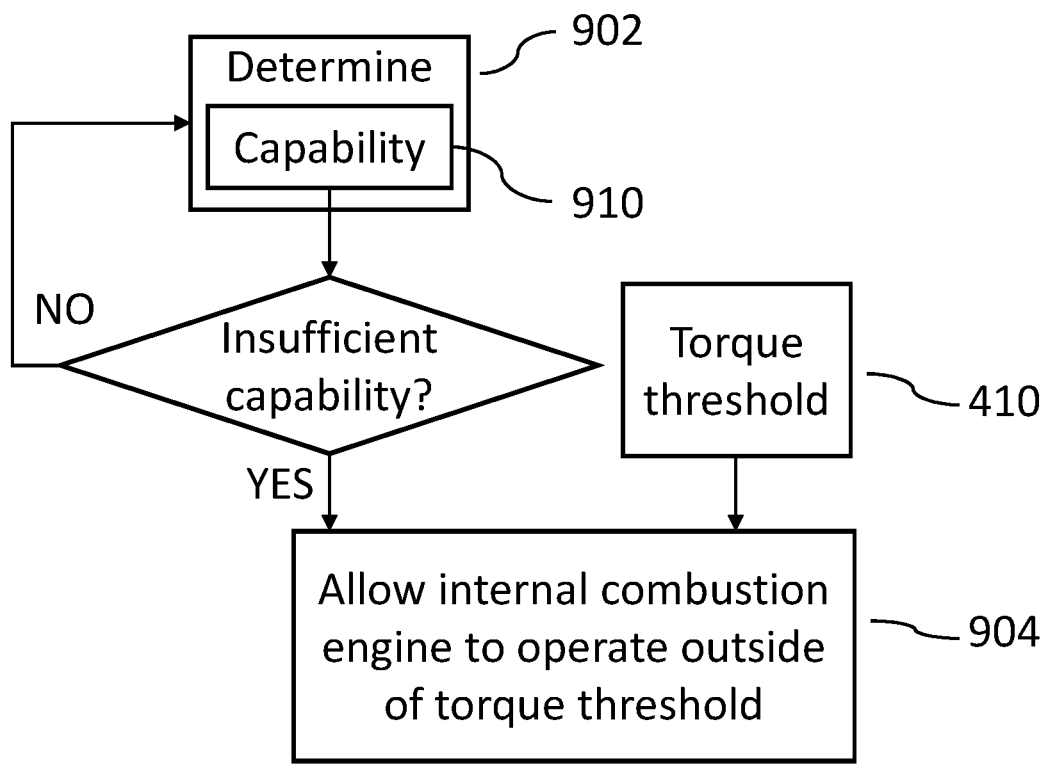
FIG. 9 illustrates an example of blocks in a method.

As illustrated in FIG. 9, block 902, the capability 910 of an electrical energy storage means 200 of the vehicle 10 to store or provide additional electrical energy is determined. At block 904 the control of the internal combustion engine 202 can be modified to allow the internal combustion engine 202 to operate outside of the at least one torque threshold 432 based at least on the capability 910 and the vehicle drive torque demand 410.

For example, where the electrical energy storage means 200 has insufficient capability 910 to store additional electrical energy, then it is determined that the at least one electric machine 212, 216 cannot provide negative (regenerative) torque in order to satisfy a difference between the at least one threshold 432 and the vehicle drive torque demand 410, if required. Thus, the internal combustion engine 202 can be allowed to stop so that the at least one electric machine 212, 216 can provide greater positive torque output 424. This will deplete the electrical energy storage means 200 so that there may subsequently be sufficient capability 910 to store additional electrical energy.

Alternatively, if it is determined that the electrical energy storage means 200 has insufficient capability 910 to provide additional electrical energy, then it is determined that the at least one electric machine 212, 216 cannot provide positive (driving) torque in order to satisfy a difference between the at least one threshold 432 and the vehicle drive torque demand 410, if required. Thus, the internal combustion engine 202 can be allowed to help meet the vehicle drive torque demand 410.

In general, where it is implausible to operate the internal combustion engine 202 within the at least one torque threshold 432 whilst meeting the vehicle drive torque demand 410

(for example, as a result of insufficient capability 910 on the part of the electrical energy storage means 200), the internal combustion engine 202 can be freed to meet, or help with meeting, the vehicle drive torque demand 410 by operating outside of the at least one torque threshold 432.

The capability 910 of an electrical energy storage means 200 of the vehicle 10 to store or provide additional electrical energy can depend, at least in part, on the age and condition of the electrical energy storage means 200, on environmental conditions such as ambient temperature, and on whether there are other heavy power users such as HVAC also demanding electrical energy. In some examples, an available or accessible state of charge of around 20% can represent a threshold or value at or below which electric vehicle mode is suspended. In some examples, an available or accessible state of charge of around 90% can represent a threshold or value at or above which requests for torque, which is additional to that required to in order to meet the vehicle drive torque demand 410, from the engine 202 can be ceased. Other thresholds or values can be useful, especially if operating in very hot or very cold climates.

While in the foregoing the method 400 has been described in relation to operating the internal combustion engine 202 within at least one torque threshold 432 for the diagnostic testing, it is to be appreciated that the method 400 can be performed with respect to a torque setpoint 438 for the diagnostic testing.

Figure 10:
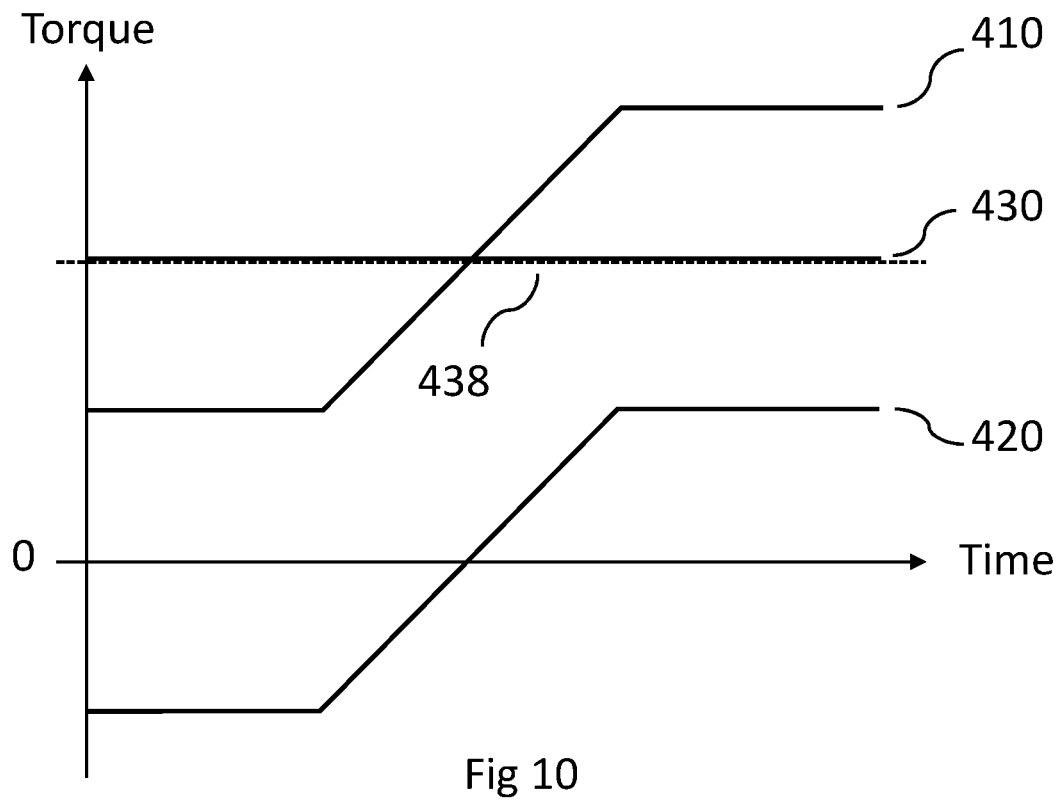
FIG. 10 illustrates a graph according to an example of the disclosure.

FIG. 10 illustrates a graph, having torque in the y-axis with respect to time in the x-axis, according to an example in which the method 400 comprises at least controlling a torque output 420 of the at least one electric machine 212, 216 to allow a vehicle drive torque demand 410 to be met while an internal combustion engine 202 is operated at a torque setpoint 438 for the diagnostic testing.

The torque setpoint 438 can be based at least on, for example, a system, component, condition, etc., which is the subject of the diagnostic testing.

The at least one electric machine 212, 216 can be controlled to provide positive torque when the vehicle drive torque demand 410 is greater than the torque set point 438. The at least one electric machine 212, 216 can be controlled to provide negative torque when the vehicle drive torque demand 410 is less than the torque set point 438.

The positive torque can be provided by controlling the electric machine which is configured to drive the axle 211 of the vehicle 10 and which is not mechanically coupled to the internal combustion engine 202 (for example, the electric traction motor 212). The positive torque can be provided to the axle 211.

The negative torque can be provided by controlling the electric machine which is mechanically coupled to the internal combustion engine (for example, the BISG 216 and/or the CIMG 216').

The method 400 can comprise determining a torque split between the at least one electric machine 212, 216 and the internal combustion engine 202, wherein the torque split in combination meets the vehicle drive torque demand 410.

In some examples, temporary departure of the output torque 430 of the internal combustion engine 202 from the torque setpoint 438 may be permitted by the torque split. This temporary departure enables the torque output 430 of the internal combustion engine 202 to vary with the vehicle drive torque demand 410, to thereby assist in the vehicle response. However, the variation may be under a stabilisation function which is configured to limit a rate of change of the torque output 430 of the internal combustion engine 202.

The control of the internal combustion engine 202 to operate at the torque setpoint 438 can be conditional upon an absence of an overriding request for operation of the vehicle 10 in an off-road mode, an off-road-suitable terrain mode, or a driving surface optimization mode. The method 400 may not be performed if the vehicle 10 is in an off-road mode, an off-road-suitable terrain mode, or a driving surface optimization mode. If the vehicle 10 is not in an off-road mode, an off-road-suitable terrain mode, or a driving surface optimization mode, the method 400 can be performed and the internal combustion engine 202 may be controlled to operate at the torque setpoint 438.

The internal combustion engine 202 can be allowed to diverge (depart) from the torque setpoint 438 based at least on a determined capability 910 of the electrical energy storage means 200 to store or provide additional electrical energy and on the vehicle drive torque demand 410.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

It will be appreciated that various changes and modifications can be made to the present invention without departing from the scope of the present application.

The blocks illustrated in the FIGS. 4, 7A, 8, and 9 may represent steps in a method 400 and/or sections of code in the computer program 306. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

For example, in some diagnostic testing the internal combustion engine 202 may be turned on for the purpose of diagnostic testing and may not be contributing to meeting the vehicle drive torque demand 410. That is, the vehicle 10 can be propelled by one or more electric machines 212, 216 alone while the diagnostic testing is performed. Once the diagnostic testing is completed the internal combustion engine 202 can be stopped. The torque threshold for next starting the internal combustion engine 202 can be reduced.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant reserves the right to claim protection in respect of any patentable feature or combination of features hereinbefore referred to and/or shown in the drawings whether or not particular emphasis has been placed thereon.

The invention claimed is:

1. A control system for controlling at least one electric machine of a vehicle to support diagnostic testing of a vehicle system comprising an internal combustion engine, the control system comprising one or more electronic controllers, the one or more electronic controllers configured to control a torque output of the at least one electric machine to allow a vehicle drive torque demand to be met while the internal combustion engine is operated within one of:
   at least one torque threshold for the diagnostic testing; and
   a torque setpoint for the diagnostic testing;
   wherein the control system is configured to:
      determine a capability of an electrical energy storage means of the vehicle to store or provide additional electrical energy; and
      allow the internal combustion engine to operate outside of the at least one torque threshold based at least on the capability and the vehicle drive torque demand.

2. The control system of claim 1, configured to determine the at least one torque threshold or the torque setpoint based at least on a subject of the diagnostic testing.

3. The control system of claim 1, wherein the at least one torque threshold for the diagnostic testing comprises an upper torque threshold for a torque output of the internal combustion engine.

4. The control system of claim 1, wherein the at least one torque threshold for the diagnostic testing comprises a lower torque threshold for a torque output of the internal combustion engine.

5. The control system of claim 1, configured to:
   where the electrical energy storage means is determined to have insufficient capability to store additional electrical energy, allow the internal combustion engine to operate outside of the at least one torque threshold or diverge from the torque setpoint and control the at least one electric machine to provide positive torque output to at least partially deplete the electrical energy storage means; and/or
   where the electrical energy storage means is determined to have insufficient capability to provide additional electrical energy, allow the internal combustion engine to operate outside of the at least one torque threshold or diverge from the torque setpoint to help meet the vehicle drive torque demand.

6. The control system of claim 1, configured to control the internal combustion engine to operate within the at least one torque threshold or at the torque setpoint for the diagnostic testing.

7. The control system of claim 1, configured to:
   control the at least one electric machine to provide positive torque when the vehicle drive torque demand is greater than the torque setpoint; and
   control the at least one electric machine to provide negative torque when the vehicle drive torque demand is less than the torque setpoint.

8. The control system of claim 1, wherein the at least one electric machine comprises an electric traction motor configured to drive an axle of the vehicle which is not mechanically coupled to the internal combustion engine and the control system is configured to control the electric traction motor configured to drive the axle of the vehicle which is not mechanically coupled to the internal combustion engine in order to provide positive torque to the axle of the vehicle which is not mechanically coupled to the internal combustion engine.

9. The control system claim 1, wherein the at least one electric machine comprises an electric motor mechanically coupled to the internal combustion engine and the control system is configured to control the electric motor mechanically coupled to the internal combustion engine in order to provide negative torque to the internal combustion engine.

10. The control system of claim 1, configured to determine a torque split between the at least one electric machine and the internal combustion engine,
    wherein the torque split in combination meets the vehicle drive torque demand, and
    wherein the torque split enables a torque output of the internal combustion engine to vary with the vehicle drive torque demand under a stabilisation function, the stabilisation function being configured to limit a rate of change of the torque output of the internal combustion engine.

11. A vehicle comprising the control system of claim 1.

12. A control system for controlling at least one electric machine of a vehicle to support diagnostic testing of a vehicle system comprising an internal combustion engine, the control system comprising:
    one or more electronic controllers, the one or more electronic controllers configured to control a torque output of the at least one electric machine to allow a vehicle drive torque demand to be met while the internal combustion engine is operated within one of:
       at least one torque threshold for the diagnostic testing; and
       a torque setpoint for the diagnostic testing;
    wherein the control system is configured to control the internal combustion engine to operate within the at least one torque threshold or at the torque setpoint for the diagnostic testing; and
    wherein the control of the internal combustion engine is conditional upon an absence of an overriding request for operation of the vehicle in an off-road mode, an off-road-suitable terrain mode, or a driving surface optimization mode.

13. A method of controlling at least one electric machine of a vehicle to support diagnostic testing of a vehicle system comprising an internal combustion engine, wherein the method comprises:

controlling a torque output of the at least one electric machine to allow a vehicle drive torque demand to be met while the internal combustion engine is operated within at least one torque threshold for the diagnostic testing or is operated at a torque setpoint for the diagnostic testing;

determining a capability of an electrical energy storage means of the vehicle to store or provide additional electrical energy; and allowing the internal combustion engine to operate outside of the at least one torque threshold based at least on the capability and the vehicle drive torque demand.

14. A non-transitory, computer-readable storage medium storing instructions thereon that, when executed by one or more electronic processors, causes the one or more electronic processors to carry out the method of claim 13.

* * * * *